United States Patent [19]

Verzaro

[11] Patent Number: 5,419,861
[45] Date of Patent: May 30, 1995

[54] METHOD FOR IMPROVING THE PAINTABILITY OF OBJECTS FASHIONED FROM POLYAMIDE AND POLYOLEFIN BLENDS

[75] Inventor: Francis Verzaro, Serres-Castet, France

[73] Assignee: Elf Aquitaine Production, Paris, France

[21] Appl. No.: 247,498

[22] Filed: May 23, 1994

Related U.S. Application Data

[63] Continuation of Ser. No. 80,390, Jun. 21, 1993, abandoned, which is a continuation of Ser. No. 768,678, Dec. 4, 1991, abandoned.

[30] Foreign Application Priority Data

Feb. 15, 1990 [FR] France .................. 90 01815

[51] Int. Cl.$^6$ ............................. B29C 71/04
[52] U.S. Cl. .................... 264/82; 427/569; 427/570; 525/408; 525/411
[58] Field of Search ............ 264/82, 22, 27, 129; 427/569, 570; 525/408, 411, 419

[56] References Cited

U.S. PATENT DOCUMENTS

| | | | |
|---|---|---|---|
| 4,331,786 | 5/1982 | Foy et al. | 525/408 |
| 4,332,920 | 6/1982 | Foy et al. | 525/408 |
| 4,465,715 | 8/1984 | Manabe et al. | 427/40 |
| 4,576,692 | 3/1986 | Fukuta et al. | 427/40 |
| 4,724,057 | 2/1988 | Ebisawa et al. | 427/40 |
| 5,069,927 | 12/1991 | Lawson et al. | 427/41 |

FOREIGN PATENT DOCUMENTS

| | | |
|---|---|---|
| 120307 | 10/1984 | European Pat. Off. . |
| 0296002 | 12/1988 | European Pat. Off. . |
| 297795 | 1/1989 | European Pat. Off. . |
| 2628115 | 9/1989 | France . |
| 2629090 | 9/1989 | France . |
| 57-78426 | 5/1982 | Japan . |
| 2172819 | 10/1986 | United Kingdom . |

OTHER PUBLICATIONS

Kirk–Othmer, *Encyclopedia of Chemical Technology*, 3rd Edition, Supplement Volume, p. 614, undated.
NF Standard T30–038, Norme Francaise, Nov., 1975, pp. 584–589.
ASTM D 3359–87, "Standard Test Methods For Measuring Adhesion By Tape Test", pp. 507–509, Sep., 1987.

*Primary Examiner*—Richard L. Chiesa
*Attorney, Agent, or Firm*—Weiser & Associates

[57] ABSTRACT

A method for improving the paintability of a shaped object of which at least the outer portion is made of a polyamide/polyolefin alloy, wherein an electrical discharge is made to act on a gas in order to create a cold plasma type reactive gas stream, and the shaped object is brought into contact with the reactive gas stream thereby produced and with an oxygen source in order to oxidize the surface of the shaped object. The method is particularly useful for treating trim for motor vehicles as well as items of garden furniture prior to painting.

35 Claims, No Drawings

METHOD FOR IMPROVING THE PAINTABILITY OF OBJECTS FASHIONED FROM POLYAMIDE AND POLYOLEFIN BLENDS

This application is a continuation of application Ser. No. 08/080,390 filed Jun. 21, 1993, now abandoned, which is a continuation of application Ser. No. 07/768,678 filed Dec. 4, 1991, now abandoned.

FIELD OF THE INVENTION

The invention relates to a process for improving the paintability of objects made from polyamide and polyolefin alloys.

BACKGROUND OF THE INVENTION

Polyamide and polyolefin alloys, especially polyamide and polypropylene alloys are polymeric materials which are in general obtained by blending a polyamide component, consisting of one or more polyamides, with a polyolefin component consisting of one or more polyolefins such as, for example, polypropylene, and an agent capable of making the two polymeric components compatible, or else by blending a polyamide component, consisting of one or more polyamides, with a modified polyolefin component consisting of one or more polyolefins, especially polypropylene, at least one of which has been modified to improve the compatibility of the polyolefin component with regard to the polyamide component. The said alloys offer an advantageous compromise between the different properties of each of the polymeric components.

It is known that polyamides are characterized by good heat stability but that their dimensional stability is affected by a relatively high water uptake, whereas polypropylene, which does not absorb water, has a dimensional stability which is not affected by the relative humidity of the surrounding air, but has a moderate heat stability and a dimensional stability which is lower than that of dry polyamide.

A polyamide and polypropylene alloy, on the other hand, will exhibit a dimensional stability intermediate between that of polypropylene and that of dry polyamide, a water uptake close to that of polypropylene and consequently a dimensional stability independent of the relative humidity of the surrounding air and also a satisfactory heat stability.

Polyamide and polyolefin alloys can be employed in particular in the motor vehicle industry sector for the production of decorative components such as wheel embellishers and body wings, or in other fields and, in particular, for the production of garden furniture.

For use in the production of decorative components for motor vehicles, a polymer alloy must have, inter alia, a good heat resistance at temperatures of the order of 180° C., which correspond to the temperature for baking the paints employed for motor vehicle body components, so that the said components made of polymer alloy can be inserted into a painting line for this same purpose as metal components, as well as a satisfactory paintability.

It is known to produce polyamide and polypropylene alloys which have the abovementioned heat stability for the production of decorative components for a motor vehicle but, on the other hand, the paintability of such components still presents a problem because of an insufficient polarity of the surface of the alloy component, which is reflected in mediocre adhesiveness between the paint coating and the said surface. An adhesiveness of this kind does not meet a motor vehicle industry specification and it is necessary to resort to a surface treatment of the said alloy component before it is painted, in order to improve its paintability.

It has been found that the surface treatment of an object made from a polyamide and polyolefin alloy by employing a cold plasma, that is to say a reactive gas flow resulting from the action of an electrical discharge on a gas, and an oxygen source constitutes a technically effective and economically viable solution for improving the paintability of the said object and, in particular, for making the adhesiveness between the paint film and the surface of the object conform to a motor vehicle industry specification.

SUMMARY OF THE INVENTION

The invention therefore proposes a process for improving the paintability of a shaped object at least the outer part of which is made of a polyamide and polyolefin alloy, this process being characterized in that an electrical discharge is made to act on a gas so as to produce a reactive gas flow of a cold plasma type and that the shaped object is brought into contact with the reactive gas flow thus produced and with an oxygen source to produce an oxidation of the surface of the shaped object.

DETAILED DESCRIPTION OF THE INVENTION

As is known in the art (cf., for example, the Kirk-Othmer encyclopaedia entitled Encyclopedia of Chemical Technology, third edition, Supplement Volume, page 614), the term "cold plasma" refers to a gaseous plasma out of thermodynamic equilibrium, in the case of which the temperature of the electrons is very high relative to the temperature of the other species present in the plasma, the latter temperature remaining close to room temperature.

In the application of the process according to the invention the production of the reactive gas flow by the action of the electrical discharge on the gas and the bringing of the shaped object to be treated into contact with the reactive gas flow and with the oxygen source can be effected simultaneously in the same single treatment zone. It is also possible to produce the reactive gas flow in a first zone and then, in a second zone, to bring the shaped object to be treated into contact with the said reactive gas flow and, in another zone, to bring the shaped object, treated with the reactive gas flow, into contact with the oxygen source. It is also possible to effect simultaneously in the same single zone the production of the reactive gas flow and the bringing of the shaped object to be treated into contact with the said reactive gas flow, and then, in another zone, to bring the shaped object, treated with the reactive gas flow, into contact with the oxygen source. Finally, it is possible to produce the reactive gas flow in one zone and then, in another zone to bring the shaped object to be treated into contact simultaneously with the reactive gas flow and the oxygen source.

The gas which is subjected to the electrical discharge to produce the reactive gas flow may be advantageously chosen from the rare gases, especially argon, helium and neon, nitrogen, oxygen, nitrogen oxides, ammonia, carbon dioxide, water vapour, organic oxygen compounds which are volatile in the conditions of use and mixtures of such gases and/or compounds, particularly air, mixtures of nitrogen and oxygen other than air and mixtures of oxygen and of one or more rare gases.

The electrical discharge may be generated in the gas by making use of any suitable system for producing an electrical discharge operating on direct current, alternating current or pulsed current, the alternating or pulsed current having a frequency ranging from low frequencies, for example 50–60 Hz, to microwave frequencies. The power of the electrical discharge generator system may range, for example, from a few watts to a few kilowatts.

For the production of the reactive gas flow which can be employed in the process according to the invention, the system for generating the electrical discharge in the gas may be, for example, a directcurrent system producing an electrical discharge which may be of the corona type, an alternating-current electrical discharge system of the type with capacitive coupling between two electrodes or of the type with inductive coupling, or else a microwave-current electrical discharge system with resonant cavity coupling.

The oxygen source which is placed in contact with the shaped object, simultaneously or subsequently to bringing the said object into contact with the reactive gas flow (cold plasma) may consist of the gas subjected to the electrical discharge when this gas contains free oxygen and/or an organic oxygen compound which is volatile in the conditions of use. The oxygen source may also consist of a gas containing free oxygen and/or an organic oxygen compound as mentioned above, which is injected into the zone for bringing the shaped object into contact with the reactive gas flow. The oxygen source may also consist of atmospheric oxygen when the shaped object is brought into contact with the surrounding atmosphere after the said object has been brought into contact with the reactive gas flow.

The temperatures of application of the process according to the invention, and in particular the temperatures at which the shaped object to be treated is brought into contact with the reactive gas flow, are in most cases equal to room temperature or close to the latter, although it is possible to operate at much higher temperatures, provided, however, that they remain below the temperatures which result in a mechanical distortion of the shaped object.

The pressure in the zone or the zones for the application of the process according to the invention may range from approximately 1 Pa to approximately $10^5$ Pa.

The duration of the treatment of the shaped object with the reactive gas flow, that is to say the time for which the said shaped object is kept in contact with the said reactive gas flow, may range, for example, approximately from 0.1 s to 200 s.

The polyamide and polyolefin alloy, which forms at least the outer part of the shape object to be treated according to the invention, and which in most cases constitutes all the substance of the said object, may be chosen from the polyamide and polyolefin alloys which are made up, as indicated above, of a blend of a polyamide component, consisting of one or more polyamides, with a polyolefin component, consisting of one or more polyolefins, and a compatibilizing agent capable of making compatible the two polymeric components which are present, or else from the polyamide and polyolefin alloys which result from the blending of a polyamide component and of a modified polyolefin component consisting of one or more polyolefins, at least one of which has been modified to improve the compatibility of the polyolefin component with regard to the polyamide component.

The polyamides from which the polyamide component of the alloy is made may be, in particular, aliphatic polyamides or copolyamides such as polyamide 6, polyamide 11, polyamide 12, copolyamide 610, copolyamide 69, copolyamide 66, polyesteramides, semiaromatic polyamides, block or random polyetheresteramides and especially the block polyetheresteramides described in patents U.S. Pat. No. 4,332,920 and U.S. Pat. No. 4,331,786.

The polyolefins from which the polyolefin component of the alloy is made are advantageously homopolymers or random or block copolymers of $C_2$–$C_{12}$ and preferably $C_2$–$C_8$ alpha-olefins, especially polypropylene, polyethylene and ethylene/propylene copolymers.

When the polyamide and polyolefin components of the alloy are made compatible by making use of a compatibilizing agent, such an agent may be chosen from the various products proposed for this purpose and advantageously from the compatibilizing agents described in references FR-A-2,629,090 and FR-A-2,628,115.

When the polyamide and polyolefin components of the alloy are made compatible by modification of at least one of the polyolefins present in the polyolefin component, the modified polyolefin may be especially a polypropylene, a polyethylene or an ethylene/propylene copolymer onto which have been grafted functional groups introducing an affinity for the polyamides, and especially a maleinized polypropylene.

Nonlimiting examples of polyamide and polyolefin alloys used to produce the shaped objects which are treated according to the invention are especially the alloys combining a polyamide component containing at least one polyamide consisting of copolyamide 66, polyamide 6, polyamide 11 or polyamide 12, with a polyolefin component comprising at least one polyolefin consisting of polypropylene, polyethylene or an ethylene/propylene copolymer and with a compatibilizing agent chosen from those described in references FR-A-2,629,090 and FR-A-2,628,115. As examples of polyamide/polyolefin alloys making use of a modified polyolefin component there may be mentioned alloys combining a maleinized polypropylene with at least one polyamide consisting of polyamide 6, polyamide 11, polyamide 12 or copolyamide 66.

The polyamide/polyolefin alloys combining a polyamide component with a polyolefin component and with a compatibilizing agent advantageously contain concentrations of each of these three constituents which are chosen so that the weight percentages x of the polyamide component, y of the polyolefin component and z of the compatibilizing agent, expressed in relation to the total of the three constituents, have values such that $40 \leq x \leq 80$, $20 \leq y \leq 59.9$ and $0.1 \leq z \leq 30$ with $x+y+z=100$, the preferred values of x, y and z being such that $50 \leq x \leq 70$, $25 \leq y \leq 55$ and $5 \leq z \leq 15$ with $x+y+z=100$.

The weight composition indicated above is, in particular, that of the polyamide and polyolefin alloys in the case of which the polyamide component is formed by at least one polyamide consisting of polyamide 6, polyamide 11, polyamide 12 or copolyamide 66, the polyolefin component is formed by at least one polyolefin consisting of polypropylene, polyethylene or an ethylene/propylene copolymer, and the compatibilizing agent is chosen from those described in references FR-A-2,629,090 and FR-A-2,628,115 and especially in the examples of these references.

In the case of the polyamide and polyolefin alloys resulting from the combination of a polyamide component, for example consisting of at least one polyamide chosen from polyamide 6, polyamide 11, polyamide 12 and copolyamide 66, and of a modified polyolefin component, for example maleinized polypropylene, the weight percentages u of the polyamide component and v of the modified polyolefin component, in relation to the total of these two components, advantageously have values such that $40 \leq u \leq 80$ and $20 \leq v \leq 60$ with $u+v=100$, preferred values of u and v being such that $50 \leq u \leq 70$ and $30 \leq v \leq 50$ with $u+v=100$.

In addition to their main constituents, namely a polyamide component, a polyolefin component or modified polyolefin component and, when present, a compatibilizing agent, the polyamide/polyolefin alloys which can be employed to form the shaped objects which are treated using the process according to the invention may also contain additives such as elastomers like maleinized EPRs, inorganic fillers like $CaCO_3$, talc and silica, fibrous reinforcing agents like glass fibers, antioxidants, heat stabilizers and stabilisers against UV radiation.

The process according to the invention can be applied to the treatment of the various objects, which may be made of polyamide and polyolefin alloys and whose paintability it is desired to improve. As shown above, these objects include, in particular, decorative components for motor vehicles, such as wheel embellishers and body wings, or else pieces of garden furniture.

The invention is illustrated by the following examples, which are given without any limitation being implied.

EXAMPLE 1

Plaques with a thickness of 3 mm were produced by injection molding of four polyamide and polyolefin alloys of different compositions and samples in the form of discs with a diameter of 6 cm were taken from these plaques and the said samples were then subjected to a treatment according to the invention.

The alloys used for the manufacture of the plaques were obtained by blending the constituents in an extruder operating at a sufficient temperature for the mixture to be molten and had the following composition, expressed by weight:

Alloy A: this alloy consisted of 51.3% of a copolyamide 66 with a melting point of 265° C., 29.7% of a polypropylene homopolymer with a melting point of 163° C. and a melt index of 0.4, 9% of a compatibilizing agent consisting of the graft copolymer obtained in Example 1C of reference FR-A-2,629,090 and 10% of an additive consisting of a maleinized EPR elastomer.

Alloy B: this alloy contained 59.8% of a copolyamide 66 with a melting of 265° C., 23% of a polypropylene homopolymer with a melting point of 163° C. and a melt index of between 4 and 6, 9.2% of a compatibilizing agent consisting of the graft copolymer obtained in Example 3C of reference FR-A-2,629,090 and 8% of an additive consisting of a maleinized EPR elastomer.

Alloy C: this alloys was made up of 42.7% of a polyamide 6 which had a melting point of 220° C., 24.8% of a polypropylene homopolymer which had a melting point of 163° C. and a melt index of between 4 and 6, 7.5% of a compatibilizing agent consisting of the graft copolymer obtained in Example 3C of reference FR-A-2,629,090 and 25% of a filler consisting of $CaCO_3$.

Alloy D: this alloy contained 57% of a polyamide 6 which had a melting point of 220° C., 33% of a polypropylene homopolymer which had a melting point of 163° C., and a melt index of between 4 and 6 and 10% of a compatibilizing agent consisting of the graft copolymer obtained in Example 1C of reference FR-A-2,629,090.

The treatment of the samples was carried out in a vessel of capacitive type, in which two horizontal electrodes were fitted, in the shape of plates 5 cm apart and each connected to one of the terminals of an alternating current generator outside the vessel, the said generator supplying an electrical current with a frequency of 20 kHz at a power of 20 or 60 W depending on the circumstances. The treatment vessel was additionally provided with a conduit for introducing a precursor gas of the reactive gas flow, opening out near the space between the electrodes, and was also connected to the suction of a primary pump enabling the desired pressure to be maintained inside the vessel.

The sample to be treated was placed between the electrodes of the vessel so as to rest on the lower electrode and as a result the said sample was situated directly in the zone of action of the reactive gas flow resulting from the action of the electrical discharge being produced between the electrodes when a voltage was applied to the latter, on the gas injected between the said electrodes, the said gas being argon in this example.

After a treatment period of 30 seconds, the sample treated with the reactive gas flow (cold plasma) was taken out of the vessel and left in contact with the surrounding atmosphere for a period of 12 hours.

At the end of this period a layer of a two-component polyurethane lacquer with a thickness of 35 to 40 $\mu$m was applied by spraying with a gun directly on to the treated surface of the sample, and the said layer was subjected to drying at 80° C. for 20 minutes.

Each sample coated with the dried lacquer film was subjected to an adhesiveness test after criss-cross scoring carried out according to NF standard T 30-038 entitled "Test for criss-cross scoring of films of paints and varnishes", to determine the adhesiveness of the film of lacquer to the surface of the sample, and a score ranging from 0 to 5 was given, as defined in the standard, to characterize this adhesiveness, the score 0 corresponding to a satisfactory adhesiveness and being required by the specification for the "painted decorative components" applications in the motor vehicle industry.

The operating conditions specific to the treatment of the samples and the results of the adhesiveness test after criss-cross scoring are listed in Table I.

TABLE I

| Alloy | Argon as precursor gas of the reactive gas flow | | |
|---|---|---|---|
| | Power delivered by the generator (watts) | Vessel pressure (Pa) | Score in the adhesiveness test after criss-cross scoring |
| A | 20 | 17.3 | 0 |
| | 20 | 30.6 | 0 |
| | 20 | 46.6 | 0 |
| B | 20 | 30.6 | 0 |
| | 20 | 46.6 | 0 |
| | 20 | 46.6 | 0 |
| | 60 | 46.6 | 0 |
| C | 20 | 17.3 | 0 |
| | 20 | 30.6 | 0 |

TABLE I-continued

Argon as precursor gas of the reactive gas flow

| Alloy | Power delivered by the generator (watts) | Vessel pressure (Pa) | Score in the adhesiveness test after criss-cross scoring |
|---|---|---|---|
| D | 20 | 46.6 | 0 |
|   | 20 | 17.3 | 0 |
|   | 20 | 30.6 | 0 |
|   | 20 | 46.6 | 0 |

As shown by the scores representing the results of the adhesiveness tests after the criss-cross scoring, the film of lacquer adheres satisfactorily (score 0) to the surface of the various samples of alloys which were treated using the process according to the invention. The said adhesiveness meets the requirements of the motor vehicle industry relating to painted decorative components.

On the other hand, in the case of the control samples of the same geometry, obtained from the various alloys A, B, C or D but not treated using the process according to the invention, the score 4 or 5 was given in each case as a result of the adhesiveness test after criss-cross scoring, which shows a mediocre to very poor adhesiveness of the lacquer film to the control samples.

EXAMPLE 2

Samples produced as indicated in Example 1 from alloys A to D were subjected to a treatment according to the invention as indicated in the said example, but changing the nature of the gas subjected to the electrical discharge to produce the reactive gas flow and varying the pressure of said gas from one treatment to another. The period for which each sample was maintained in contact with the reactive gas flow was 30 seconds.

The samples treated with the reactive gas flow were taken out of the vessel and subjected to the adhesiveness test after criss-cross scoring as detailed in Example 1.

The operating conditions specific to the treatment of the samples and the results of the adhesiveness test after criss-cross scoring are collated in Table II.

TABLE II

| Precursor gas of the reactive gas flow | Alloy | Power delivered by the generator (watts) | Vessel pressure (Pa) | Score in the test for adhesiveness after criss-cross scoring |
|---|---|---|---|---|
| Oxygen | B | 20 | 17.3 | 0 |
|        |   | 20 | 30.6 | 0 |
|        |   | 20 | 46.6 | 0 |
|        |   | 20 | 93.1 | 0 |
|        | C | 20 | 17.3 | 0 |
|        |   | 20 | 30.6 | 0 |
|        |   | 20 | 46.6 | 0 |
| Nitrogen | C | 20 | 17.3 | 0 |
|          |   | 20 | 30.6 | 0 |
|          |   | 20 | 46.6 | 0 |
| Air | B | 20 | 17.3 | 0 |
|     |   | 20 | 30.6 | 0 |
|     |   | 20 | 46.6 | 0 |
|     |   | 20 | 93.1 | 0 |
|     | C | 20 | 17.3 | 0 |
|     |   | 20 | 30.6 | 0 |
|     |   | 20 | 46.6 | 0 |

As follows from the scores given in the adhesiveness test after criss-cross scoring, carried out on the samples treated as indicated in Example 2, the use of oxygen, nitrogen or air as precursor gases of the reactive gas flow produces results which are comparable with those obtained in Example 1 with argon as precursor gas, that is to say a satisfactory adhesiveness of the film of lacquer to the samples treated with the reactive gas flow.

I claim:

1. A process for improving the adhesion of paint to a shaped object, at least the outer part of which is made of a blend of polyamide and polyolefin, the surface of the outer part having insufficient polarity for adhesion of paint, which comprises providing a reactive gas flow of cold plasma produced by generating an electrical discharge in a gas, contacting the shaped object with the reactive gas flow at a pressure between about 1 Pa and about $10^5$ Pa, and then contacting the shaped object with oxygen, for a time sufficient to oxidize the surface of the shaped object, said oxidized shaped object having improved paintability,
    wherein the production of the reactive gas flow and the contacting of the shaped object to be treated with said reactive gas flow are effected simultaneously in a single zone, and
    wherein the electrical discharge is generated by an electrical discharge system selected from the group consisting of a direct-current electrical discharge system and an alternating-current electrical discharge system with capacitive coupling between two electrodes.

2. The process according to claim 1, wherein the reactive gas flow is produced from a gas selected from the group of gases consisting of argon, helium, neon, nitrogen, oxygen, nitrogen oxides, ammonia, carbon dioxide, water vapor, organic oxygen compounds, air and mixtures of said gases.

3. The process according to claim 2, wherein the gas is air.

4. The process according to claim 2, wherein the gas is a mixture of nitrogen and oxygen other than air.

5. The process according to claim 2, wherein the gas is a mixture of oxygen and one or more gases selected from the group of rare gases consisting of argon, helium and neon.

6. The process according to claim 1, wherein the production of the reactive gas flow by the action of the electrical discharge on the gas and the contacting of the shaped object to be treated with the reactive gas flow and with the oxygen are effected simultaneously in a single treatment zone.

7. The process according to claim 6, wherein the reactive gas flow is produced from oxygen, said reactive gas flow also supplying the oxygen for oxidizing the surface of the shaped object.

8. The process according to claim 1, wherein the shaped object treated with the reactive gas flow is brought into contact with the oxygen in a subsequent zone.

9. The process according to claim 8, wherein the oxygen is air.

10. The process according to claim 1, wherein the shaped object is contacted with the reactive gas flow for a time from about 0.1 second to about 200 seconds.

11. The process according to claim 1, wherein the shaped object is made entirely of the blend.

12. The process according to claim 1, wherein the polyamide is selected from the group consisting of aliphatic polyamides, copolyamides, polyesteramides, semiaromatic polyamides, random polyetheresteramides and block polyetheresteramides.

13. The process according to claim 12, wherein the aliphatic polyamides are selected from the group consisting of polyamide 6, polyamide 11 and polyamide 12.

14. The process according to claim 12, wherein the copolyamides are selected from the group consisting of copolyamide 610, copolyamide 69 and copolyamide 66.

15. The process according to claim 1, wherein the polyolefin is selected from the group consisting of homopolymers, random copolymers and block copolymers of $C_2$–$C_{12}$ alpha-olefins.

16. The process according to claim 15, wherein the $C_2$–$C_{12}$ alpha-olefins are selected from the group consisting of polypropylene, polyethylene and copolymers of ethylene and propylene.

17. The process according to claim 1, wherein the weight percentage of the polyamide in the blend represents from about 40% to 80% based on the total weight of the polyamide and polyolefin.

18. The process according to claim 17, wherein the weight percentage of the polyamide represents from about 50% to 70% based on the total weight of the polyamide and polyolefin.

19. The process according to claim 1, wherein the blend further comprises one or more additives selected from the group consisting of elastomers, inorganic fillers, fibrous reinforcing agents, antioxidants, heat stabilizers and stabilizers against UV radiation.

20. The process according to claim 19, wherein the elastomer is a maleinized EPR.

21. The process according to claim 19, wherein the inorganic fillers are selected from the group consisting of $CaCO_3$, talc and silica.

22. The process according to claim 19, wherein the fibrous reinforcing agents are glass fibers.

23. The process according to claim 1, wherein the shaped object is a decorative component for a motor vehicle.

24. The process according to claim 23, wherein the decorative component is a wheel embellisher or a body wing.

25. The process according to claim 1, wherein the reactive gas flow is produced from a gas selected from the group of gases consisting of argon, helium, neon, nitrogen, nitrogen oxides, ammonia, carbon dioxide, air and mixtures of said gases.

26. The process according to claim 1, wherein the object, after contacting with the reactive gas flow, is directly contacted thereafter with the oxygen.

27. The process according to claim 1, wherein the oxygen is atmospheric oxygen.

28. The process of claim 1 wherein the pressure of the reactive gas flow is between about 17.3 Pa and about 93.1 Pa.

29. A process for producing a shaped and painted object, at least the outer part of which is made of a blend of polyamide and polyolefin, the surface of the outer part having insufficient polarity for adhesion of paint, which comprises providing a reactive gas flow of cold plasma produced by generating an electrical discharge in a gas, contacting the shaped object with the reactive gas flow at a pressure between 1 Pa and $10^5$ Pa, contacting the shaped object with oxygen, for a time sufficient to oxidize the surface of the shaped object, thereby improving the surface of the object for paint adhesion and coating the oxidized surface of the object with paint, wherein the production of the reactive gas flow and the contacting of the shaped object to be treated with said reactive gas flow are effected simultaneously in a single zone, and wherein the electrical discharge is generated by an electrical discharge system selected from the group consisting of a direct-current electrical discharge system and an alternating-current electrical discharge system with capacitive coupling between two electrodes.

30. The process of claim 29 wherein the contacting of the shaped object to be treated with the reactive gas flow and with the oxygen is effected simultaneously in a single treatment zone.

31. The process of claim 30 wherein the reactive gas flow is produced from oxygen, said reactive gas flow also supplying the oxygen for oxidizing the surface of the shaped object.

32. The process of claim 29 wherein the shaped object treated with the reactive gas flow is brought into contact with the oxygen in a subsequent zone.

33. The process of claim 32 wherein the reactive gas flow is produced from oxygen, said reactive gas flow also supplying the oxygen for oxidizing the surface of the shaped object.

34. The process of claim 29 wherein the reactive gas flow is produced from a gas selected from the group of gases consisting of argon, helium, neon, nitrogen, oxygen, nitrogen oxides, ammonia, carbon dioxide, water vapor, organic oxygen compounds, air, and mixtures of said gases.

35. The process of claim 29 wherein the paint is a polyurethane lacquer.

* * * * *